(12) United States Patent
Ma (10) Patent No.: US 11,979,020 B1
(45) Date of Patent: May 7, 2024

(54) APPARATUS FOR SUPPRESSING PEAK PULSE AT INPUT END OF HOT PLUG LINE

(71) Applicant: SUZHOU METABRAIN INTELLIGENT TECHNOLOGY CO., LTD., Jiangsu (CN)

(72) Inventor: Yichao Ma, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/569,021

(22) PCT Filed: Jun. 2, 2022

(86) PCT No.: PCT/CN2022/096828
§ 371 (c)(1),
(2) Date: Dec. 11, 2023

(87) PCT Pub. No.: WO2023/115832
PCT Pub. Date: Jun. 29, 2023

(30) Foreign Application Priority Data

Dec. 22, 2021 (CN) .......................... 202111575546.6

(51) Int. Cl.
*H02H 9/02* (2006.01)
*H02H 9/04* (2006.01)

(52) U.S. Cl.
CPC ............ *H02H 9/025* (2013.01); *H02H 9/045* (2013.01)

(58) Field of Classification Search
CPC ........ H02H 9/025; H02H 9/045; H02H 9/004; G06F 1/26; G06F 13/4081
See application file for complete search history.

(56) References Cited

U.S. PATENT DOCUMENTS

| 8,278,997 | B1 * | 10/2012 | Kim .......................... G06F 1/26 327/541 |
| 9,454,503 | B1 | 9/2016 | Sizikov et al. |
| 10,971,923 | B2 * | 4/2021 | Zhu ........................ H02H 9/001 |
| 11,100,255 | B1 | 8/2021 | Eftimie et al. |
| 2009/0237849 | A1 | 9/2009 | Hsieh |

(Continued)

FOREIGN PATENT DOCUMENTS

| CN | 202957572 U | 5/2013 |
| CN | 103618286 A | 3/2014 |

(Continued)

*Primary Examiner* — Jared Fureman
*Assistant Examiner* — Nicolas Bellido
(74) *Attorney, Agent, or Firm* — IPro, PLLC (57) ABSTRACT

An apparatus includes an absorption circuit, a control circuit and a hot plug line; an input end of the absorption circuit is connected to an input end of the hot plug line, an input end of the control circuit is connected to the input end of the hot plug line, output ends of the absorption circuit and the control circuit are grounded, an output end of the hot plug line is connected to an input end of a sub-node mainboard, and the input end of the hot plug line is connected to a power supply end of a whole cabinet; the absorption circuit includes a first capacitor; in response to the hot plug line being connected to the power supply end of the whole cabinet, the first capacitor is not powered on; in response to the sub-node mainboard being powered on, the first capacitor is powered on.

20 Claims, 2 Drawing Sheets

(56) References Cited

U.S. PATENT DOCUMENTS

| | | |
|---|---|---|
| 2017/0256933 A1 | 9/2017 | Chen et al. |
| 2020/0067305 A1 | 2/2020 | Zhu et al. |
| 2022/0283976 A1* | 9/2022 | Long ................... G06F 13/4081 |

FOREIGN PATENT DOCUMENTS

| | | | | |
|---|---|---|---|---|
| CN | 104218558 A | | 12/2014 | |
| CN | 204559104 U | | 8/2015 | |
| CN | 106055506 A | | 10/2016 | |
| CN | 106873747 A | * 6/2017 | ............. G06F 1/305 |
| CN | 107546731 A | | 1/2018 | |
| CN | 108736874 A | | 11/2018 | |
| CN | 108832601 A | | 11/2018 | |
| CN | 110289607 A | | 9/2019 | |
| CN | 212258411 U | | 12/2020 | |
| CN | 113964808 A | | 1/2022 | |

\* cited by examiner

APPARATUS FOR SUPPRESSING PEAK PULSE AT INPUT END OF HOT PLUG LINE

CROSS REFERENCE TO RELEVANT APPLICATIONS

The present application claims the priority of the Chinese patent application filed on Dec. 22, 2021 before the China National Intellectual Property Administration with the application number of 202111575546.6 and the title of "APPARATUS FOR SUPPRESSING PEAK PULSE AT INPUT END OF HOT PLUG LINE", which is incorporated herein in its entirety by reference.

FIELD

The present application relates to an apparatus for suppressing a peak pulse at an input end of a hot plug line.

BACKGROUND

A whole cabinet server is a popular product form in the server industry. When additional sub-node servers need to be added to the cabinet, the sub-node server will be directly installed in the live cabinet, that is, the sub-node server will be plugged into the live cabinet, and the normal operation of the remaining sub-node servers in the cabinet should not be affected. Therefore, a hot plug line is usually designed inside the sub-node server to ensure the safety and stability of a hot plug action. However, the hot plug line has some security risks when ensuring the hot plug function of the sub-node server. The moment when the sub-node server is plugged into the cabinet and the moment when a sub-node server mainboard is short-circuited, both will cause voltage peak pulses to be generated at an input end of the hot plug line. These peak pulses will break down sensitive electronic components of the board, or even cause the board to be burned and the whole cabinet downtime. At present, a Transient Voltage Suppressor (TVS) is usually added to the input end of the hot plug line, because a TVS voltage-regulator tube has a good suppression effect on the plugged peak pulses.

However, the inventor has realized that in a scenario of short circuit at a load end, due to a large amount of energy needs to be released, the TVS voltage-regulator tube may be short-circuited and fail due to the impact of an instantaneous high voltage. Once the TVS voltage-regulator tube is short-circuited and fails, the power supply of the whole cabinet will be directly connected to the ground, which will cause the downtime of the whole cabinet, accompanied by major quality accidents such as burning board.

It can be seen that how to avoid problems, such as the downtime of the whole cabinet caused by the short circuit at the load end when the TVS voltage-regulator tube fails, is a technical problem that needs to be solved urgently by a person skilled in the art.

SUMMARY

According to various embodiments disclosed in the present application, an apparatus for suppressing a peak pulse at an input end of a hot plug line is provided, including:

An absorption circuit, a control circuit and the hot plug line.

An input end of the absorption circuit is connected with the input end of the hot plug line, an input end of the control circuit is connected with the input end of the hot plug line, an output end of the absorption circuit and an output end of the control circuit are grounded, an output end of the hot plug line is used for connecting with an input end of a sub-node mainboard, and the input end of the hot plug line is used for connecting with a power supply end of a whole cabinet;

The absorption circuit includes a first capacitor, and in response to the hot plug line being connected to the power supply end of the whole cabinet, the first capacitor is not powered on; and in response to the sub-node mainboard being powered on, the first capacitor is powered on.

The control circuit includes a Transient Voltage Suppressor (TVS) voltage-regulator tube, and in response to the hot plug line being connected to the power supply end of the whole cabinet, the TVS voltage-regulator tube is powered on; and in response to the sub-node mainboard being powered on, the TVS voltage-regulator tube is not powered on.

In one or more embodiments, in the apparatus for suppressing the peak pulse at the input end of the hot plug line, the absorption circuit further includes a first Metal Oxide Semiconductor (MOS) transistor.

The first MOS transistor is connected in series with the first capacitor, the first MOS transistor is used for controlling whether the first capacitor is conductive, and a G end of the first MOS transistor is connected with the sub-node mainboard.

In one or more embodiments, in the apparatus for suppressing the peak pulse at the input end of the hot plug line, the control circuit further includes a second MOS transistor, a third MOS transistor, a first resistor and a second resistor.

A D end of the second MOS transistor is connected with the input end of the hot plug line, a S end of the second MOS transistor is connected with a negative electrode of the TVS voltage-regulator tube, a first end of the first resistor is connected with the input end of the hot plug line, a second end of the first resistor is connected with a first end of the second resistor, a G end of the second MOS transistor, and a D end of the third MOS transistor; a positive electrode of the TVS voltage-regulator tube, a second end of the second resistor and a S end of the third MOS transistor are grounded, and a G end of the third MOS transistor is connected with the sub-node mainboard.

In one or more embodiments, in the apparatus for suppressing the peak pulse at the input end of the hot plug line, a D end of the first MOS transistor is connected with the input end of the hot plug line, a S end of the first MOS transistor is connected with a first end of the first capacitor, a second end of the first capacitor is grounded, and the G end of the first MOS transistor is connected with the sub-node mainboard.

In one or more embodiments, in the apparatus for suppressing the peak pulse at the input end of the hot plug line, the sub-node mainboard includes a BUCK circuit and a BOOST circuit.

The G end of the third MOS transistor is connected with the BUCK circuit.

The G end of the first MOS transistor is connected with the BOOST circuit.

In one or more embodiments, in the apparatus for suppressing the peak pulse at the input end of the hot plug line, the BUCK circuit is connected with the BOOST circuit.

In one or more embodiments, in the apparatus for suppressing the peak pulse at the input end of the hot plug line, the sub-node mainboard includes a switch, and the switch is used for controlling start of the BUCK circuit.

In one or more embodiments, in the apparatus for suppressing the peak pulse at the input end of the hot plug line, the first MOS transistor is an N-type MOS transistor.

In one or more embodiments, in the apparatus for suppressing the peak pulse at the input end of the hot plug line, the first resistor and the second resistor are thin film patch resistors.

In one or more embodiments, in the apparatus for suppressing the peak pulse at the input end of the hot plug line, the first capacitor is a decoupling capacitor The details of one or more embodiments of the present application are provided in the following drawings and description. The other characteristics and advantages of the present application will become apparent from the description, the drawings and the claims.

BRIEF DESCRIPTION OF THE DRAWINGS

In order to more clearly illustrate the embodiments of the present application, the figures that are required to describe the embodiments will be briefly described below. Apparently, the figures that are described below are merely some embodiments of the present application, and a person skilled in the art is capable to obtain other embodiments according to these figures without paying creative work.

DETAILED DESCRIPTION

In the following, the technical solutions in the embodiment of the present application will be clearly and completely described with reference to the drawings in the embodiments of the present application. Obviously, the described embodiments are only a portion of the embodiments of the present application, but not all the embodiments. Based on the embodiments in the present application, all other embodiments obtained by a person skilled in the art without creative work belong to the protection scope of the present application.

The core of the present application is to provide an apparatus for absorbing peak pulses caused by the load end being short-circuited when the TVS voltage-regulator tube fails.

In order to make a person skilled in the art better understand the solution of the present application, the present application will be further explained in detail with the drawings and specific embodiments.

Figure 1:
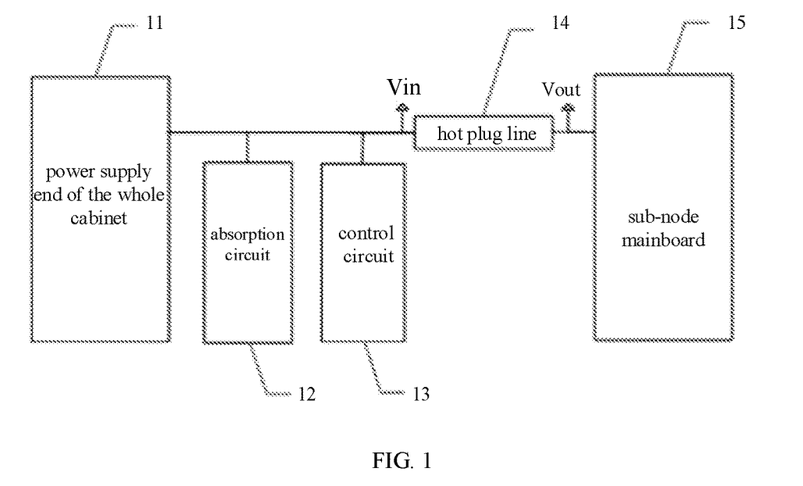
FIG. 1 is a schematic diagram of the apparatus for suppressing the peak pulse at the input end of the hot plug line according to an embodiment of the present application.
Figure 2:
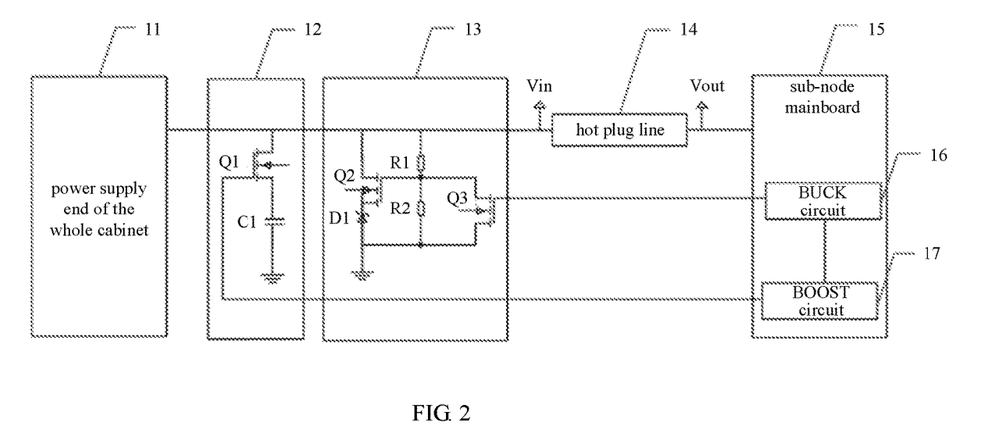
FIG. 2 is a detailed schematic diagram of the apparatus for suppressing the peak pulse at the input end of the hot plug line according to an embodiment of the present application.

FIG. 1 is a schematic diagram of the apparatus for suppressing the peak pulse at the input end of the hot plug line according to embodiments of the present application. FIG. 2 is a detailed schematic diagram of the apparatus for suppressing the peak pulse at the input end of the hot plug line according to embodiments of the present application.

The embodiments of the present application provide an apparatus for suppressing a peak pulse at an input end of a hot plug line, including:

An absorption circuit 12, a control circuit 13 and the hot plug line 14.

An input end of the absorption circuit 12 is connected with the input end of the hot plug line 14, an input end of the control circuit 13 is connected with the input end of the hot plug line 14, an output end of the absorption circuit 12 and an output end of the control circuit 13 are grounded, an output end Vout of the hot plug line 14 is used for connecting with an input end of a sub-node mainboard 15, and the input end Vin of the hot plug line 14 is used for connecting with a power supply end 11 of a whole cabinet.

The absorption circuit 12 includes a first capacitor C1, and in response to the hot plug line 14 being connected to the power supply end 11 of the whole cabinet, the first capacitor C1 is not powered on; and in response to the sub-node mainboard 15 being powered on, the first capacitor C1 is powered on.

The control circuit 13 includes a TVS voltage-regulator tube, and in response to the hot plug line 14 being connected to the power supply end 11 of the whole cabinet, the TVS voltage-regulator tube D1 is powered on; and in response to the sub-node mainboard being powered on, the TVS voltage-regulator tube D1 is not powered on.

The apparatus for suppressing the peak pulse at the input end of the hot plug line provided in the embodiments of the present application includes: the absorption circuit, the control circuit and the hot plug line. Among them, the input end of the absorption circuit is connected with the input end of the hot plug line, the input end of the control circuit is connected with the input end of the hot plug line, the output end of the absorption circuit and the output end of the control circuit are grounded, the output end of the hot plug line is used for connecting with an input end of the sub-node mainboard, and the input end of the hot plug line is used for connecting with the power supply end of the whole cabinet. The absorption circuit includes the first capacitor, and in response to the hot plug line being connected to the power supply end of the whole cabinet, the first capacitor is not connected; and in response to the sub-node mainboard being powered on, the first capacitor is connected. The control circuit includes the TVS voltage-regulator tube, and in response to the hot plug line being connected to the power supply end of the whole cabinet, the TVS voltage-regulator tube is connected; and in response to the sub-node mainboard being powered on, the TVS voltage-regulator tube is not connected. When the hot plug line is connected to the power supply end of the whole cabinet, the first capacitor in the absorption circuit is not connected, and the TVS voltage-regulator tube in the control circuit is connected, the TVS voltage-regulator tube suppresses the peak pulse generated by the hot plug action. In response to the sub-node mainboard being powered on, the TVS voltage voltage-regulator tube in the control circuit is not connected, and the first capacitor in the absorption circuit is connected. In response to the short circuit of the sub-node mainboard, the first capacitor in the absorption circuit works at this time, and the first capacitor absorbs the peak pulse of the short circuit. The first capacitor is charged and released subsequently. Consequently, even if the sub-node mainboard is short-circuited when the TVS voltage-regulator tube fails, the peak pulse during the short circuit is capable to be suppressed, and the problem, such as the downtime of the whole cabinet caused by the short circuit of the load end when the TVS voltage-regulator tube fails, is avoided.

The whole cabinet server is a popular product form in the server industry. Inside the cabinet, the requirement for the sub-node servers with electric-hot plugging is necessary. In some embodiments, the whole cabinet server is always working without powered off after being powered on. When additional sub-node servers need to be added to the whole cabinet server, the sub-node servers will be directly installed in the live cabinet, that is, the sub-node server will be plugged into the live cabinet, and the normal operation of the remaining sub-node servers in the cabinet should not be affected. Therefore, a hot plug line 14 is usually designed inside the sub-node server to ensure the safety and stability of the hot plug actions.

The connection relationship of the absorption circuit 12, the control circuit 13 and the hot plug line 14 mentioned in the present embodiment is shown in FIG. 1. The input end of the absorption circuit 12 is connected with the input end of the hot plug line 14, the input end of the control circuit 13 is connected with the input end of the hot plug line 14, the output end of the absorption circuit 12 and the output end of the control circuit 13 are grounded, the output end Vout of the hot plug line 14 is used for connecting with the input end of the sub-node mainboard 15, and the input end Vin of the hot plug line 14 is used for connecting with the power supply end of the whole cabinet 11.

As mentioned in the present embodiment, the output end Vout of the hot plug line 14 is used for connecting with the input end of the sub-node mainboard 15, and the input end of the hot plug line 14 is used for connecting with the power supply end of the whole cabinet 11. However, the hot plug line 14 has some security risks when ensuring the hot plug function of the sub-node. The moment when the sub-node server mainboard is short-circuited will cause the input end of the hot plug line 14 to generate the voltage peak pulses. These peak pulses will break down sensitive electronic components of the board, or even cause the board to burn and downtime of the whole cabinet. By placing the TVS voltage-regulator tube D1 at the input end of the hot plug line 14, the oscillation generated when the hot-plug circuit 14 is plugged or unplugged will be suppressed. However, under the short circuit condition, high-energy impact may make the TVS short-circuit fail, resulting in a greater quality accident. By placing a filter capacitor at the input end Vin of the hot plug line 14, however, this method will aggravate the oscillation when the hot plug line 14 is connected, but in the case of the short circuit at the load end, the filter capacitor will have a better suppression effect on the oscillation caused by the short circuit.

As mentioned in the present embodiment, the absorption circuit 12 includes the first capacitor C1. The input end of the absorption circuit 12 is connected with the input end of the hot plug line 14, and the output end of the absorption circuit 12 is grounded. The absorption circuit 12 includes not only the first capacitor C1, but also other control components for controlling the first capacitor C1 not to be connected when the hot plug line 14 is connected with the power supply end 11 of the whole cabinet, and the first capacitor C1 to be connected when the sub-node mainboard 15 is powered on. The present embodiment does not limit the specific forms of the control components, for example a MOS transistor, a relay or a processor, and does not limit the number of the control components.

In addition, the present embodiment provides another solution of the first capacitor C1. The first capacitor C1 is a decoupling capacitor with high voltage resistance, which has the characteristics of direct-current high voltage resistance and is capable to effectively absorb the peak pulse when the load is short-circuited.

The TVS voltage-regulator tube D1 mentioned in the present embodiment is capable to immediately reduce its working impedance to a very low conduction value when being subjected to a high-energy instantaneous over voltage pulse, to absorb instantaneous large current and clamp the voltage at its both ends to a predetermined value, thus protecting the behind circuit components from the impact of a transient high-voltage peak pulse. However, when under the load short circuit condition, the impact of instantaneous high voltage may make the TVS voltage-regulator tube D1 short-circuit and fail, resulting in a greater quality accident. In the environment that the TVS voltage-regulator tube D1 is often used, when the transient pulse energy is greater than the energy that the TVS voltage-regulator tube D1 may bear, it will cause over voltage stress damage of the TVS voltage-regulator tube D1, especially when the transient energy is far more than several times the energy that the TVS voltage-regulator tube D1 can bear, it will directly cause over voltage stress burning of the TVS voltage-regulator tube D1, which will lead to short circuit failure. When the current passing through the circuit is too large, it may cause the TVS voltage-regulator tube D1 to burst, which will lead to open circuit failure. When the TVS voltage-regulator tube D1 is subjected to thousands of standard pulse impacts, it will lead to the short circuit failure. Therefore, the TVS voltage-regulator tube D1 is a device that is a relatively easily damaged device.

The control circuit 13 mentioned in the present embodiment includes a TVS voltage-regulator tube D1, and the input end of the control circuit 13 is connected with the input end of the hot plug line 14, and the output end of the control circuit 13 is grounded. The control circuit 13 includes not only the TVS voltage-regulator tube D1, but also other components. In the control circuit 13, the TVS voltage-regulator tube D1 is connected in response to the hot plug line 14 being connected with the power supply end 11 of the whole cabinet, and the TVS voltage-regulator tube D1 is not connected in response to the sub-node mainboard 15 being powered on.

In addition, it should be noted that, the power supply end 11 of the whole cabinet mentioned in the present embodiment refers to a device that provides power for the sub-node mainboard 15, which may be a server, a power supply or a sub-node mainboard, and the present embodiment is not limited.

Figure 3:
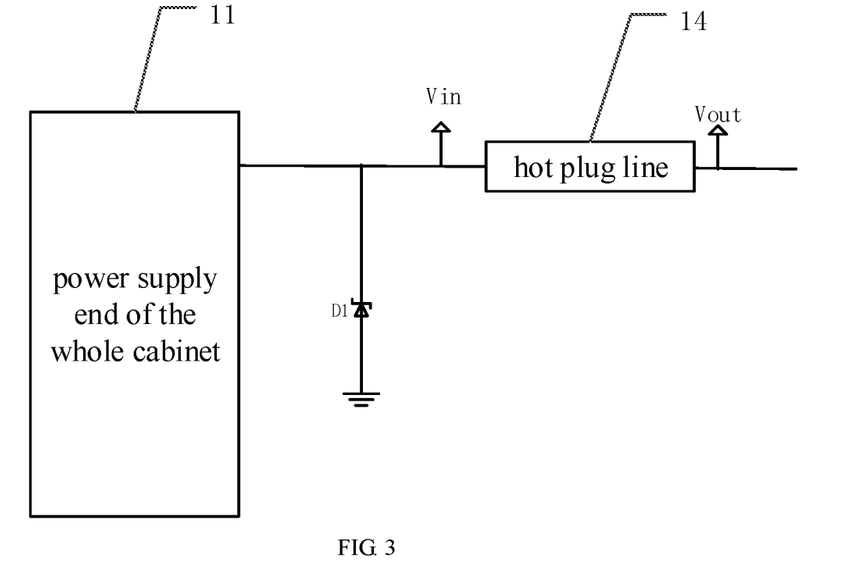
FIG. 3 is an equivalent circuit diagram when the input end of the hot plug line is connected to the power supply end of the whole cabinet according to an embodiment of the present application.

In some embodiments, in response to the input end of the hot plug line 14 being connected with the power supply end 11 of the whole cabinet, the first capacitor C1 in the absorption circuit 12 is not connected, and the TVS voltage-regulator tube D1 in the control circuit 13 is connected, that is, the TVS voltage-regulator tube D1 works to suppress the peak pulse generated by the hot plug action. FIG. 3 is an equivalent circuit diagram when the hot plug line being connected to the power supply end of the whole cabinet according to embodiments of the present application. As shown in FIG. 3, the TVS voltage-regulator tube D1 absorbs the peak pulse generated when the input end of the hot plug line 14 is connected with the power supply end 11 of the whole cabinet.

Figure 4:
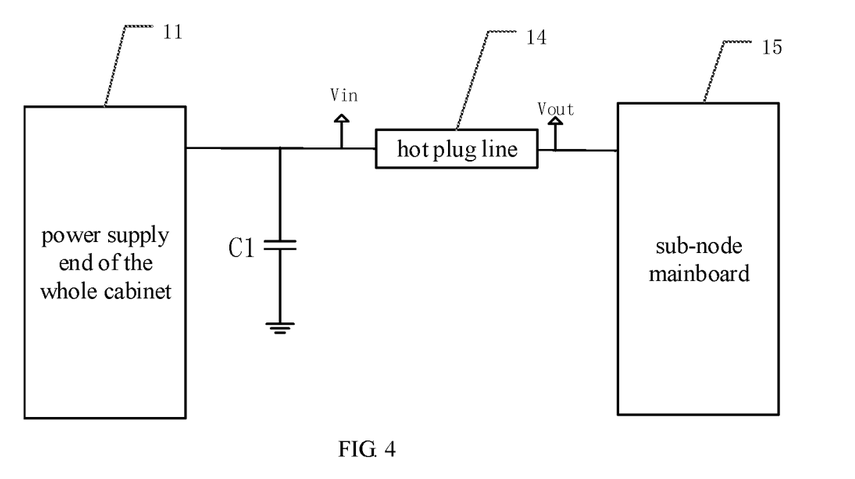
FIG. 4 is an equivalent circuit diagram when the sub-node mainboard is powered on according to an embodiment of the present application.

In response to the sub-node mainboard 15 being powered on, the TVS voltage-regulator tube D1 in the control circuit 13 is not connected, and the first capacitor C1 in the absorption circuit 12 is connected, that is, in response to the normal operation of the sub-node mainboard 15, the first capacitor C1 of the absorption circuit 12 works. FIG. 4 is an equivalent circuit diagram when sub-node mainboard being powered on according to embodiments of the present application. As shown in FIG. 4, the first capacitor C1 is connected in response to the sub-node mainboard 15 being powered on.

When the normal working sub-node mainboard 15 is short-circuited, since the first capacitor C1 is working at this time, the first capacitor C1 absorbs the short-circuited peak pulse, and the first capacitor C1 is charged, and released subsequently to suppress the short-circuited peak pulse. As shown in FIG. 4, the first capacitor C1 absorbs the peak pulse of short circuit, and the first capacitor C1 is charged and released subsequently to suppress the peak pulse during the short circuit.

Consequently, even if the sub-node mainboard 15 is short-circuited when the TVS voltage-regulator tube D1 fails, the first capacitor C1 in the absorption circuit 12 works, absorbs the short-circuited peak pulse, and is charged and released subsequently, and the first capacitor C1 suppresses the peak pulse during the short circuit, thus the problem, such as the downtime of the whole cabinet caused by the short circuit at the load end when the TVS voltage-regulator tube D1 fails, is avoided.

According to the above-mentioned embodiment, the absorption circuit 12 includes not only the first capacitor C1, but also other control components for controlling the first capacitor C1 not to be connected when the hot plug line 14 is connected with the power supply end 11 of the whole cabinet, and the first capacitor C1 is connected when the sub-node mainboard 15 is powered on. The present embodiment provides another solution of the absorption circuit 12, in the apparatus for suppressing the peak pulse at the input end of the hot plug line, the absorption circuit 12 further includes a first Metal Oxide Semiconductor Field Effect Transistor (MOS transistor) Q1.

The first MOS transistor Q1 is connected in series with the first capacitor C1, and the first MOS transistor Q1 is used for controlling whether the first capacitor C1 is conductive, and a G end of the first MOS transistor Q1 is connected with the sub-node mainboard 15.

The G end of the first MOS transistor Q1 is connected with the sub-node mainboard 15 for receiving a control voltage signal sent by the sub-node mainboard 15. When the sub-node mainboard 15 is powered on, the control voltage signal is sent to the first MOS transistor Q1, this control voltage signal makes the first MOS transistor Q1 and the first capacitor C1 turn on, so that the first capacitor C1 works. As shown in FIG. 4, when the sub-node mainboard 15 is powered on, the first MOS transistor Q1 is turned on, which is approximately regarded as a wire, and the first capacitor C1 is connected. When the normally working sub-node mainboard 15 is short-circuited, since the first capacitor C1 is working at this time, the first capacitor C1 absorbs the peak pulse of the short circuit, and the first capacitor C1 is charged and released subsequently, thus the peak pulse during the short circuit is suppressed.

In addition, it should be noted that, the present embodiment is not limited to the control voltage signal sent by the sub-node mainboard 15 to the first MOS transistor Q1, which may be designed according to the specific actual situation.

In one or more embodiments, the first MOS transistor Q1 is an N-type MOS transistor. The carrier mobility of the N-type MOS transistor is about three times that of the same type of P-type MOS transistor, which means that its conductivity is stronger. The price of the P-type MOS transistor is relatively higher. In addition, since the N-type MOS transistor is capable to be turned on with a positive voltage, while a negative voltage should be used to turn on the P-type MOS transistor, the N-type MOS transistor is more convenient to use.

In some embodiments, after the sub-node mainboard 15 is powered on, a control voltage signal is sent to the first MOS transistor Q1 to control the first MOS transistor Q1 to be turned on, which makes the first capacitor C1 be connected to the circuit. When the sub-node mainboard 15 is short-circuited, since the TVS voltage-regulator tube D1 is not working at this time, while the first capacitor C1 is working, the first capacitor C1 absorbs the peak pulse of the short circuit, and the first capacitor C1 is charged and released subsequently. Therefore, even if the sub-node mainboard 15 is short-circuited when the TVS voltage-regulator tube D1 fails, the peak pulse during the short circuit may be suppressed, and problems, such as the downtime of the whole cabinet caused by the short circuit at the load end when the TVS voltage-regulator tube D1 fails, are avoided.

According to the above-mentioned embodiment, in response to the hot plug line 14 being connected to the power supply end 11 of the whole cabinet, the TVS voltage-regulator tube D1 in the control circuit 13 is connected, and in response to the sub-node mainboard 15 being powered on, the TVS voltage-regulator tube D1 is not connected. The present embodiment provides another solution of the control circuit 13, as shown in FIG. 1, in the apparatus for suppressing the peak pulse at the input end of the hot plug line, the control circuit 13 further includes a second MOS transistor Q2, a third MOS transistor Q3, a first resistor R1 and a second resistor R2.

A D end of the second MOS transistor Q2 is connected with the input end of the hot plug line 14, a S end of the second MOS transistor Q2 is connected with the negative electrode of the TVS voltage-regulator tube D1; a first end of the first resistor R1 is connected with the input end of the hot plug line 14, a second end of the first resistor R1 is connected with a first end of the second resistor R2, a G end of the second MOS transistor Q2 and a D end of the third MOS transistor Q3; a positive electrode of the TVS voltage-regulator tube D1, a second end of the second resistor R2 and a S end of the third MOS transistor Q3 are grounded, and a G end of the third MOS transistor Q3 is connected with the sub-node mainboard 15.

In the present embodiment, the first MOS transistor Q1 and the second MOS transistor Q2 are both N-type MOS transistors, the D end of the second MOS transistor Q2 is connected with the input end of the hot plug line 14, the S end of the second MOS transistor Q2 is connected with the negative electrode of the TVS voltage-regulator tube D1, and the first end of the first resistor R1 is connected with the input end of the hot plug line 14. The second end of the first resistor R1 is connected with the first end of the second resistor R2, the G end of the second MOS transistor Q2, and the D end of the third MOS transistor Q3; the positive electrode of the TVS voltage-regulator tube D1, the second end of the second resistor R2 and the S end of the third MOS transistor Q3 are grounded; the G end of the third MOS transistor Q3 is connected with the sub-node mainboard 15, and the G end of the third MOS transistor Q3 receives the control voltage signal sent by the sub-node mainboard 15.

In some embodiments, in response to the hot plug line 14 being connected to the power supply end 11 of the whole cabinet, the input end Vin of the hot plug line 14 obtains direct-current power from the power supply end 11 of the whole cabinet, and the G end of the second MOS transistor Q2 divides the voltage from the input end Vin of the hot plug line 14 to obtain a high level, and the S end of the second MOS transistor Q2 is connected in series with the TVS voltage-regulator tube D1 to ground, which is at a low level in this point. At this time, the second MOS transistor Q2 is turned on, and the TVS voltage-regulator tube D1 is connected in parallel to the Vin link to filter the voltage pulses generated by the hot plug line 14 connecting with the power supply end 11 of the whole cabinet. At this time, the sub-node mainboard 15 is not powered on, the third MOS transistor Q3 is in a disconnected state, and the first MOS transistor Q1 is also in the disconnected state. Therefore, the G end of the second MOS transistor Q2 will not be pulled down, and the first capacitor C1 will not be connected in parallel to the input end of the hot plug line 14. As shown in FIG. 3, the second MOS transistor Q2 is turned on, which may be approximately regarded as a wire, the TVS voltage-regulator tube D1 is connected to the circuit, the third MOS transistor Q3 and the first MOS transistor Q1 are both turned off, and the TVS voltage-regulator tube D1 absorbs the peak pulse generated when the input end of the hot plug line 14 is connected to the power supply end 11 of the whole cabinet. Therefore, after the hot plug line 14 is connected to the power supply end 11 of the whole cabinet, the first capacitor C1 does not work, and the TVS voltage-regulator tube D1 works, and the TVS voltage-regulator tube D1 absorbs the peak pulse. Since the first capacitor C1 does not work, the peak voltage of the oscillation is reduced, and the probability that the TVS voltage-regulator tube D1 is broken down is greatly reduced.

In response to the sub-node mainboard 15 being powered on, the sub-node mainboard 15 sends the control voltage signal to the G end of the third MOS transistor Q3 to control the third MOS transistor Q3 to be turned on, which causes the G end of the second MOS transistor Q2 to be pulled down, and causes the second MOS transistor Q2 to be turned off, which leads to the TVS voltage regulator tube D1 to be disconnected from the input end of the hot plug line 14. In addition, the sub-node mainboard 15 sends the control voltage signal to the G end of the first MOS transistor Q1 to control the first MOS transistor Q1 to be turned on. Therefore, the first capacitor C1 is connected in parallel with the input end of the hot plug line 14. As shown in FIG. 4, the first MOS transistor Q1 is turned on, which is approximately regarded as a wire, and the first capacitor C1 is connected. Therefore, when the sub-node mainboard 15 is powered on, the first capacitor C1 works, and the TVS voltage-regulator tube D1 does not work. After the first capacitor C1 is connected to the circuit, it will prepare for filtering the voltage impact of the hot plug input end when the sub-node mainboard 15 is short-circuited.

In response to the sub-node mainboard 15 needing to be pulled out from the whole cabinet, the sub-node mainboard 15 is powered off first, the first MOS transistor Q1 is turned off, the first capacitor C1 is turned off from the circuit, the third MOS transistor Q3 is turned off, the second MOS transistor Q2 is turned on, and the TVS voltage-regulator tube D1 is connected to the circuit, as shown in FIG. 3. After that, the hot plug line 14 is disconnected from the power supply end 11 of the whole cabinet, and the TVS voltage-regulator tube filters the peak pulse. In addition, since the first capacitor C1 is not connected at this time, the first capacitor C1 will not increase the voltage oscillation of the power supply end 11 of the whole cabinet.

In response to the short circuit occurring during the normal operation of the sub-node mainboard 15, a high peak pulse will be generated at the input end of the hot plug line 14 at this time. In this point, since the TVS voltage-regulator tube D1 does not work and the first capacitor C1 works, the first capacitor C1 absorbs the peak pulse of the short circuit, and the first capacitor C1 is charged and released subsequently. As shown in FIG. 4, merely the first capacitor C1 is connected to the circuit. When the sub-node mainboard 15 which is normally working is short-circuited, since the first capacitor C1 is working at this time, the first capacitor C1 absorbs the peak pulse of the short circuit, and the first capacitor C1 is charged and released subsequently to suppress the peak pulse of the short circuit. Therefore, even if the sub-node mainboard 15 is short-circuited when the TVS voltage regulator D1 fails, the peak pulse during the short circuit is suppressed, and the problems, such as the downtime of the whole cabinet caused by the short circuit at the load end when the TVS voltage-regulator tube D1 fails, are avoided.

According to the above-mentioned embodiment, the first resistor R1 and the second resistor R2 are connected in series to divide the voltage, to provide the voltage for the second MOS transistor Q2. In one or more embodiments, the first resistor R1 and the second resistor R2 are thin film patch resistors. In the present embodiment, the specific resistance values of the first resistor R1 and the second resistor R2 are not limited, and they can be designed according to the actual situation.

The thin film patch resistor is ubiquitous in electronic circuits and is one of the essential electronic components in most circuits. The thin film patch resistor is made by using thin film technology, sputtering and depositing a metal resistor film (0.2~1 μm) on a ceramic substrate, and being packaged after precise resistance adjustment. The thin film patch resistors may be made for various resistance values by selecting films with appropriate thickness, and specific films correspond to a certain range of resistance values. The thin film patch resistor has the advantages of high resistance precision, a low temperature coefficient, low loss, low noise, low parasitic effect, excellent high-frequency performance, miniaturization of chip, and is suitable for Surface Mounting Technology (SMT) processes. The thin film patch resistor is capable to well realize the function of voltage division and current limiting.

According to the above-mentioned embodiment, the absorption circuit 12 includes a first capacitor C1 in the apparatus for suppressing the peak pulse at the input end of the hot plug line, the D end of the first MOS transistor Q1 is connected with the input end of the hot plug line 14, the S end of the first MOS transistor Q1 is connected with the first end of the first capacitor C1, the second end of the first capacitor C1 is grounded, and the G end of the first MOS transistor Q1 is connected with the sub-node mainboard 15.

As shown in FIG. 1, the D end of the first MOS transistor Q1 is connected to the input end of the hot plug line 14, the S end of the first MOS transistor Q1 is connected to the first end of the first capacitor C1, and the second end of the first capacitor C1 is grounded, and the G end of the first MOS transistor Q1 is connected with the sub-node mainboard 15 to receive the control voltage signal sent by the sub-node mainboard 15. The D end of the first MOS transistor Q1 is connected with the input end of the hot plug line 14. In response to the hot plug line 14 being connected with the power supply end 11 of the whole cabinet, the voltage of the D end of the first MOS transistor Q1 is the voltage of the power supply end 11 of the whole cabinet. Therefore, the control voltage signal sent by the sub-node mainboard 15 should be greater than the output voltage of the power supply end 11 of the whole cabinet. The control voltage signal makes the first MOS transistor Q1 be turned on, and the first capacitor C1 is connected to the circuit. As shown in FIG. 4, in response to the short circuit of the sub-node mainboard 15, the first capacitor C1 absorbs the peak pulse to prevent the whole cabinet from downtime and other problems.

According to the above-mentioned embodiment, the sub-node mainboard 15 sends the control signal to the absorption circuit 12 and the control circuit 13 to control whether the first capacitor C1 and the TVS voltage-regulator tube D1 are connected to the circuit. The present embodiment provides another solution, in the apparatus for suppressing the peak pulse at the input end of the hot plug line, the sub-node mainboard 15 includes a BUCK circuit 16 and a BOOST circuit 17.

The G end of the third MOS transistor Q3 is connected with the BUCK circuit 16.

The G end of the first MOS transistor Q1 is connected with the BOOST circuit 17.

The BUCK circuit 16 mentioned in the present embodiment refers to a BUCK converter circuit. Through the BUCK circuit 16, the voltage input by the hot plug line 14 is reduced to the required voltage for each of the components on the sub-node mainboard 15, and the voltage is also reduced to the turn-on voltage of the third MOS transistor Q3 to control the third MOS transistor Q3 to be turned on. The D end of the third MOS transistor Q3 pulls down the voltage at the G end of the second MOS transistor Q2, and the second MOS transistor Q2 is turned off, and the TVS voltage-regulator tube D1 does not work.

The BOOST circuit 17 mentioned in the present embodiment refers to a BOOST converter circuit. The voltage input by the hot plug line 14 is raised by the BOOST circuit 17, and the Boost circuit 17 inputs the raised voltage signal to the G end of the first MOS transistor Q1 to control the first MOS transistor Q1 to be turned on, and the first capacitor C1 is connected to the circuit. In response to the Boost circuit 17 being powered off, the first MOS transistor Q1 is turned off and the first capacitor C1 does not work.

In the present embodiment, the specific circuit structures of the BUCK circuit 16 and the BOOST circuit 17 are not limited, as long as the above-mentioned requirements is met. The BOOST circuit 17 is powered on and work after receiving the power-on signal sent by the BUCK circuit 16, and the BOOST circuit 17 may also determine whether to be powered on and work by receiving a command signal of a control chip of the sub-node mainboard 15. The present embodiment is not limited.

In the solution provided by the present embodiment, through the BUCK circuit 16/BOOST circuit 17, the control voltage signals with different sizes are output to control the turn-on and turn-off of the MOS transistor, to control whether the first capacitor C1 and the TVS voltage-regulator tube D1 are connected to the circuit, to absorb the peak pulse at the input end of the hot plug line 14 under different conditions.

According to the above-mentioned embodiment, in order to improve the working efficiency of the BOOST circuit 17, in one or more embodiments, the BUCK circuit 16 is connected with the BOOST circuit 17.

In some embodiments, the BUCK circuit 16 works to power on each of the components. When the last circuit is started, this circuit outputs a power good signal, indicating that the BUCK circuit 16 of the mainboard has been powered on. The power good signal output by the BUCK circuit 16 is connected to the enable interface of the BOOST circuit 17 to control the BOOST circuit 17 to be powered on and work. Every component of the sub-node mainboard 15 is powered on through the BUCK circuit 16. It takes a certain time for the BOOST circuit 17 to be connected to the power supply to output a stable output voltage. In order to avoid the abnormal voltage from damaging the circuit, the BOOST circuit 17 will first check whether the output voltage is normal, and when the output voltage is normal, the power good signal is input, and connected to the enable interface of the BOOST circuit 17 to control the BOOST circuit 17 to power on and work.

According to the above-mentioned embodiment, in response to the hot plug line 14 being connected to the power supply end 11 of the whole cabinet, the sub-node mainboard 15 will not be powered on in real time. The present embodiment provides another solution, in the apparatus for suppressing the peak pulse at the input end of the hot plug line, and the sub-node mainboard 15 includes a switch, and the switch is used for controlling the start of the BUCK circuit 16.

In some embodiments, in response to starting the switch, the BUCK circuit 16 starts to work to power up each of the components. The switch mentioned in the present embodiment may be a manual switch to determine whether the sub-node mainboard 15 is powered on, or may be an automatic switch. By setting a preset time, the sub-node mainboard 15 is controlled to be powered on after the hot plug line 14 is connected after the preset time. The present embodiment is not particularly limited.

The apparatus for suppressing the peak pulse at the input end of the hot plug line provided by the present application is introduced in detail above. Each of the embodiments in the description is described in a progressive way, and each of the embodiments focuses on the differences from other embodiments, so it is merely necessary to refer to the same and similar portions between each of the embodiments. As for the device disclosed in the embodiments, because it corresponds to the method disclosed in the embodiments, the description is relatively simple, please refer to the method section for relevant details. It should be pointed out that, for a person skilled in the art, without departing from the principles of the present application, several improvements and modifications may be made to the present application, and these improvements and modifications also fall within the protection scope of the claims of the present application.

It should also be noted that, in the present specification, relational terms for example first and second are merely used to distinguish one entity or operation from another entity or operation, and do not necessarily require or imply that any such actual relationship or order exists between these entities or operations. Moreover, the terms "comprise", "include" or any other variation thereof are intended to cover non-exclusive inclusion, so that a process, method, product or apparatus including a series of elements includes not only those elements, but also other elements not explicitly listed or elements inherent to such process, method, product or apparatus. Without more restrictions, an element defined by the phrase "including one" does not exclude the existence of other identical elements in the process, method, product or apparatus including the element.

The invention claimed is:

1. An apparatus for suppressing a peak pulse at an input end of a hot plug line, comprising:
   an absorption circuit, a control circuit and the hot plug line; wherein:
   an input end of the absorption circuit is connected with the input end of the hot plug line, an input end of the control circuit is connected with the input end of the hot plug line, an output end of the absorption circuit and an output end of the control circuit are grounded, an output end of the hot plug line is used for connecting with an input end of a sub-node mainboard, and the input end of the hot plug line is used for connecting with a power supply end of a whole cabinet;

the absorption circuit comprises a first capacitor, and in response to the hot plug line being connected to the power supply end of the whole cabinet, the first capacitor is not powered on; and in response to the sub-node mainboard being powered on, the first capacitor is powered on; and the control circuit comprises a Transient Voltage Suppressor (TVS) voltage-regulator tube, and in response to the hot plug line being connected to the power supply end of the whole cabinet, the TVS voltage-regulator tube is powered on; and in response to the sub-node mainboard being powered on, the TVS voltage-regulator tube is not powered on.

2. The apparatus for suppressing the peak pulse at the input end of the hot plug line according to claim 1, wherein the absorption circuit further comprises a first Metal Oxide Semiconductor (MOS) transistor; and the first MOS transistor is connected in series with the first capacitor, the first MOS transistor is used for controlling whether the first capacitor is conductive, and a G end of the first MOS transistor is connected with the sub-node mainboard.

3. The apparatus for suppressing the peak pulse at the input end of the hot plug line according to claim 2, wherein the control circuit further comprises a second MOS transistor, a third MOS transistor, a first resistor and a second resistor; and a D end of the second MOS transistor is connected with the input end of the hot plug line, a S end of the second MOS transistor is connected with a negative electrode of the TVS voltage-regulator tube; a first end of the first resistor is connected with the input end of the hot plug line, a second end of the first resistor is connected with a first end of the second resistor, a G end of the second MOS transistor, and a D end of the third MOS transistor; a positive electrode of the TVS voltage-regulator tube, a second end of the second resistor and a S end of the third MOS transistor are grounded, and a G end of the third MOS transistor is connected with the sub-node mainboard.

4. The apparatus for suppressing the peak pulse at the input end of the hot plug line according to claim 3, wherein the sub-node mainboard comprises a BUCK circuit and a BOOST circuit;

the G end of the third MOS transistor is connected with the BUCK circuit; and the G end of the first MOS transistor is connected with the BOOST circuit.

5. The apparatus for suppressing the peak pulse at the input end of the hot plug line according to claim 4, wherein the BUCK circuit is connected with the BOOST circuit.

6. The apparatus for suppressing the peak pulse at the input end of the hot plug line according to claim 4, wherein the sub-node mainboard comprises a switch, and the switch is used for controlling start of the BUCK circuit.

7. The apparatus for suppressing the peak pulse at the input end of the hot plug line according to claim 4, wherein the BUCK circuit is a BUCK converter circuit, and the BUCK converter circuit is used to reduce a voltage input by the hot plug line to a required voltage for each component on the sub-node mainboard.

8. The apparatus for suppressing the peak pulse at the input end of the hot plug line according to claim 4, wherein the BOOST circuit is a BOOST converter circuit, and the BOOST converter circuit is used to raise a voltage input by the hot plug line, and to input a raised voltage signal to the G end of the first MOS transistor to control the first MOS transistor to be turned on.

9. The apparatus for suppressing the peak pulse at the input end of the hot plug line according to claim 3, wherein the first resistor and the second resistor are thin film patch resistors.

10. The apparatus for suppressing the peak pulse at the input end of the hot plug line according to claim 3, wherein in response to the hot plug line being connected to the power supply end of the whole cabinet, the input end of the hot plug line obtains direct-current power from the power supply end of the whole cabinet, and the G end of the second MOS transistor divides a voltage from the input end of the hot plug line to obtain a high level;

the S end of the second MOS transistor is connected in series with the TVS voltage-regulator tube to ground to obtain a low level, so that the second MOS transistor is turned on.

11. The apparatus for suppressing the peak pulse at the input end of the hot plug line according to claim 10, wherein when the second MOS transistor is turned on, the TVS voltage-regulator tube is connected in parallel to a Vin link to filter voltage pulses generated by the hot plug line connecting with the power supply end of the whole cabinet.

12. The apparatus for suppressing the peak pulse at the input end of the hot plug line according to claim 3, wherein in response to the sub-node mainboard being powered on, the sub-node mainboard sends the control voltage signal to the G end of the third MOS transistor to control the third MOS transistor to be turned on, to cause the G end of the second MOS transistor to be pulled down, to cause the second MOS transistor to be turned off, and to lead to the TVS voltage regulator tube to be disconnected from the input end of the hot plug line.

13. The apparatus for suppressing the peak pulse at the input end of the hot plug line according to claim 3, wherein in response to the sub-node mainboard needing to be pulled out from the whole cabinet, the sub-node mainboard is powered off, the first MOS transistor is turned off, the first capacitor is turned off from a circuit, the third MOS transistor is turned off, the second MOS transistor is turned on, and the TVS voltage-regulator tube is connected to the circuit.

14. The apparatus for suppressing the peak pulse at the input end of the hot plug line according to claim 3, wherein the first resistor and the second resistor are connected in series to divide a voltage, to provide the voltage for the second MOS transistor.

15. The apparatus for suppressing the peak pulse at the input end of the hot plug line according to claim 2, wherein a D end of the first MOS transistor is connected with the input end of the hot plug line, a S end of the first MOS transistor is connected with a first end of the first capacitor, a second end of the first capacitor is grounded, and the G end of the first MOS transistor is connected with the sub-node mainboard.

16. The apparatus for suppressing the peak pulse at the input end of the hot plug line according to claim 2, wherein the first MOS transistor is an N-type MOS transistor.

17. The apparatus for suppressing the peak pulse at the input end of the hot plug line according to claim 2, wherein the G end of the first MOS transistor is connected with the sub-node mainboard for receiving a control voltage signal sent by the sub-node mainboard;

when the sub-node mainboard is powered on, the control voltage signal is sent to the first MOS transistor to make the first MOS transistor and the first capacitor turn on, so that the first capacitor works.

18. The apparatus for suppressing the peak pulse at the input end of the hot plug line according to claim 1, wherein the first capacitor is a decoupling capacitor.

19. The apparatus for suppressing the peak pulse at the input end of the hot plug line according to claim 1, wherein the power supply end of the whole cabinet is a device that provides power for the sub-node mainboard.

20. The apparatus for suppressing the peak pulse at the input end of the hot plug line according to claim 19, wherein the power supply end of the whole cabinet is a server, a power supply or a sub-node mainboard.

\* \* \* \* \*